(12) United States Patent
Oshida et al.

(10) Patent No.: US 11,958,326 B2
(45) Date of Patent: Apr. 16, 2024

(54) ACTUATOR OR SUSPENSION

(71) Applicant: THK CO., LTD., Tokyo (JP)

(72) Inventors: Takashi Oshida, Tokyo (JP); Takashi Sakuyama, Tokyo (JP); Tetsuhiro Nishide, Tokyo (JP); Hiroshi Kaneshige, Tokyo (JP); Sho Taniguchi, Tokyo (JP)

(73) Assignee: THK CO., LTD., Tokyo (JP)

( * ) Notice: Subject to any disclaimer, the term of this patent is extended or adjusted under 35 U.S.C. 154(b) by 77 days.

(21) Appl. No.: 17/775,088

(22) PCT Filed: Nov. 2, 2020

(86) PCT No.: PCT/JP2020/040999
§ 371 (c)(1),
(2) Date: May 6, 2022

(87) PCT Pub. No.: WO2021/100445
PCT Pub. Date: May 27, 2021

(65) Prior Publication Data
US 2022/0396110 A1    Dec. 15, 2022

(30) Foreign Application Priority Data

Nov. 19, 2019    (JP) .................................. 2019-208426

(51) Int. Cl.
*B60G 15/06*    (2006.01)
*B60G 17/00*    (2006.01)
(Continued)

(52) U.S. Cl.
CPC .............. *B60G 17/00* (2013.01); *F16H 25/20* (2013.01); *B60G 2202/30* (2013.01); *B60G 2500/30* (2013.01); *F16H 2025/2084* (2013.01)

(58) Field of Classification Search
CPC .. B60G 15/063; B60G 17/00; B60G 17/0157; B60G 2202/30; B60G 2202/312;
(Continued)

(56) References Cited

U.S. PATENT DOCUMENTS

| | | | |
|---|---|---|---|
| 2010/0148463 A1 | 6/2010 | Wang et al. | |
| 2014/0172236 A1* | 6/2014 | Nishikawa | B62D 5/003 |
| | | | 701/42 |
| 2019/0105958 A1* | 4/2019 | Mochizuki | B62K 25/10 |

FOREIGN PATENT DOCUMENTS

| | | |
|---|---|---|
| JP | 8-276882 A | 10/1996 |
| JP | 2005-140144 A | 6/2005 |

(Continued)

OTHER PUBLICATIONS

Description Translation for JP 2008/303963 from Espacenet (Year: 2008).*

(Continued)

*Primary Examiner* — Jason D Shanske
*Assistant Examiner* — Daniel M. Keck
(74) *Attorney, Agent, or Firm* — WHDA, LLP

(57) ABSTRACT

An actuator whose total length can be reduced is provided. An actuator (2) includes: a casing (7); a hollow shaft (8) rotatably supported by the casing (7) via a bearing (9a, 9b), the hollow shaft (8) including a bottom portion (8b); a screw shaft (14) coupled to the bottom portion (8b) of the hollow shaft (8), the screw shaft (14) sharing a common center line with the hollow shaft (8); and a nut (15) threadedly connected to the screw shaft (14). The nut (15) is capable of moving in an axial direction of the screw shaft (14) to enter between the hollow shaft (8) and the screw shaft (14).

17 Claims, 6 Drawing Sheets

(51) Int. Cl.
*B60G 17/015* (2006.01)
*F16F 9/46* (2006.01)
*F16F 9/56* (2006.01)
*F16H 25/20* (2006.01)
*F16H 25/24* (2006.01)

(58) Field of Classification Search
CPC ............ B60G 2202/42; B60G 2202/44; B60G 2202/442; B60G 2204/4192; B60G 2204/62; B60G 2206/40; B60G 2500/30; F16F 9/46; F16F 9/56; F16H 25/20; F16H 2025/2084; F16H 25/24
See application file for complete search history.

(56) References Cited

FOREIGN PATENT DOCUMENTS

| | | | | |
|---|---|---|---|---|
| JP | 2008247054 | A | * | 10/2008 |
| JP | 2008303963 | A | * | 12/2008 |
| JP | 2010-25139 | A | | 2/2010 |
| JP | 2011122643 | A | * | 6/2011 |
| JP | 2012072867 | A | * | 4/2012 |
| JP | 2016-17535 | A | | 2/2016 |
| JP | 2019002461 | A | * | 1/2019 |
| WO | WO-2020003977 | A1 | * | 1/2020 ........... B60G 11/003 |

OTHER PUBLICATIONS

International Search Report dated Dec. 8, 2020, issued in counterpart International Application No. PCT/JP2020/040999. (2 pages).

\* cited by examiner

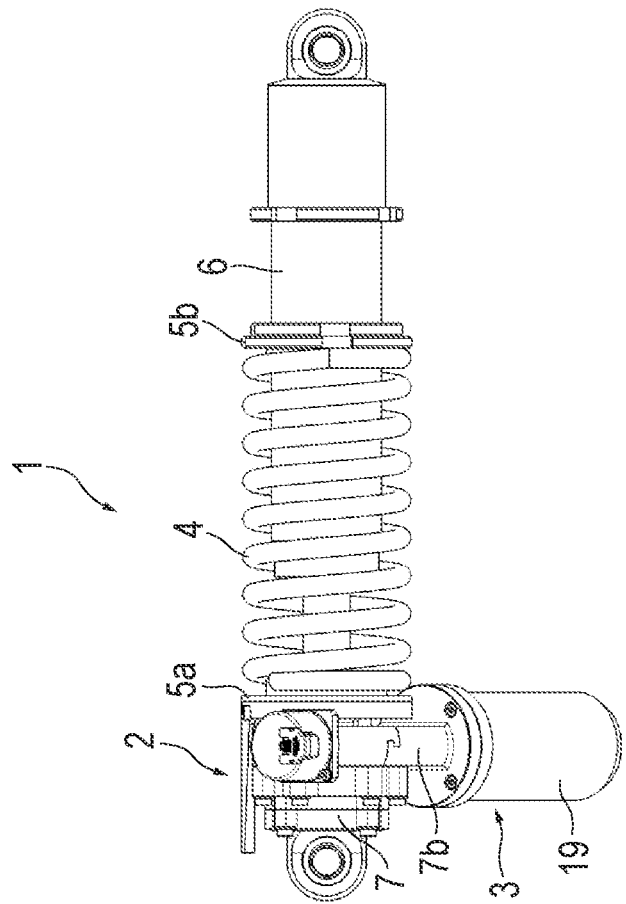
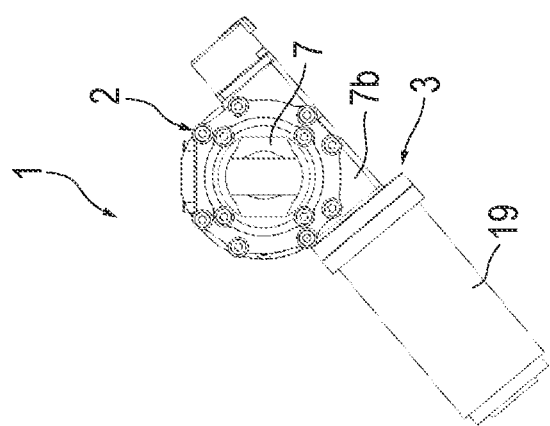

ACTUATOR OR SUSPENSION

TECHNICAL FIELD

The present invention relates to an actuator including a screw mechanism, or a suspension including a screw mechanism.

BACKGROUND ART

An actuator including a screw mechanism is conventionally known. The screw mechanism includes a screw shaft and a nut that is threadedly connected to the screw shaft. When the screw shaft is rotationally driven, the nut moves relatively in the axial direction of the screw shaft. As a suspension where the actuator is incorporated, that is, a suspension including the screw mechanism, a height adjustable suspension is known (refer to Patent Literature 1). When the screw shaft is rotationally driven by a drive unit, the nut moves in the axial direction. The nut is coupled to a spring bearing that receives one end of a suspension spring. The position of the spring bearing in the axial direction, together with the nut, is adjusted. As a result, the height of the vehicle body can be adjusted.

Moreover, as another conventional suspension including the screw mechanism, an electromagnetic suspension is known (refer to Patent Literature 2). In the electromagnetic suspension, the screw mechanism is used to convert a change in the distance between the body side portion and the wheel side portion of the vehicle to the rotational motion of the screw shaft. The screw is connected to a motor that resists the rotation of the screw shaft. The resistance of the motor enables producing a damping force.

CITATION LIST

Patent Literature

Patent Literature 1: JP H8-276882 A
Patent Literature 2: JP 2005-140144 A

SUMMARY OF INVENTION

Technical Problem

However, in the known actuator including the screw mechanism, it is necessary to make the screw shaft long to ensure the stroke of the nut relative to the screw shaft. Consequently, there is a problem that the total length of the actuator is long. If the space for the placement of the actuator is small, it is desired to reduce the total length of the actuator.

The known suspension including the screw mechanism also has a similar problem. In other words, in the known suspension including the screw mechanism, it is necessary to make the screw shaft long to ensure the stroke of the nut relative to the screw shaft. Consequently, there is a problem that the total length of the suspension is long. If the space for the placement of the actuator is small, it is desired to reduce the total length of the actuator. If the space for the placement of the suspension is small, it is desired to reduce the total length of the suspension.

The present invention has been made considering the above problem, and an object thereof is to provide an actuator or suspension whose total length can be reduced.

Solution to Problem

In order to solve the above problem, an aspect of the present invention is an actuator including: a casing; a hollow shaft rotatably supported by the casing via a bearing, the hollow shaft including a bottom portion; a screw shaft coupled to the bottom portion of the hollow shaft, the screw shaft sharing a common center line with the hollow shaft; and a nut threadedly connected to the screw shaft, in which the nut is capable of moving in an axial direction of the screw shaft to enter between the hollow shaft and the screw shaft.

Another aspect of the present invention is a suspension including: a casing; a screw shaft rotatably supported by the casing via a bearing; a nut threadedly connected to the screw shaft; and a shock absorber including an inner rod, in which the nut is coupled to the inner rod of the shock absorber, and a hollow portion of the inner rod allows the screw shaft to enter.

Still another aspect of the present invention is a suspension including: a casing; a screw shaft rotatably supported by the casing via a bearing; a nut threadedly connected to the screw shaft; a projection fixed to an outer surface of the casing; and an anti-rotation member coupled to the nut, including a groove formed to allow the projection to fit therein, to prevent the rotation of the nut.

Advantageous Effects of Invention

According to the present invention, it is possible to reduce the total length of an actuator or suspension.

BRIEF DESCRIPTION OF DRAWINGS

FIGS. 1(a) and 1(b) are an external view of a suspension of a first embodiment of the present invention where an actuator of the first embodiment of the present invention is incorporated (FIG. 1(a) is a side view, and FIG. 1(b) is a front view).

DESCRIPTION OF EMBODIMENTS

Figure 2:
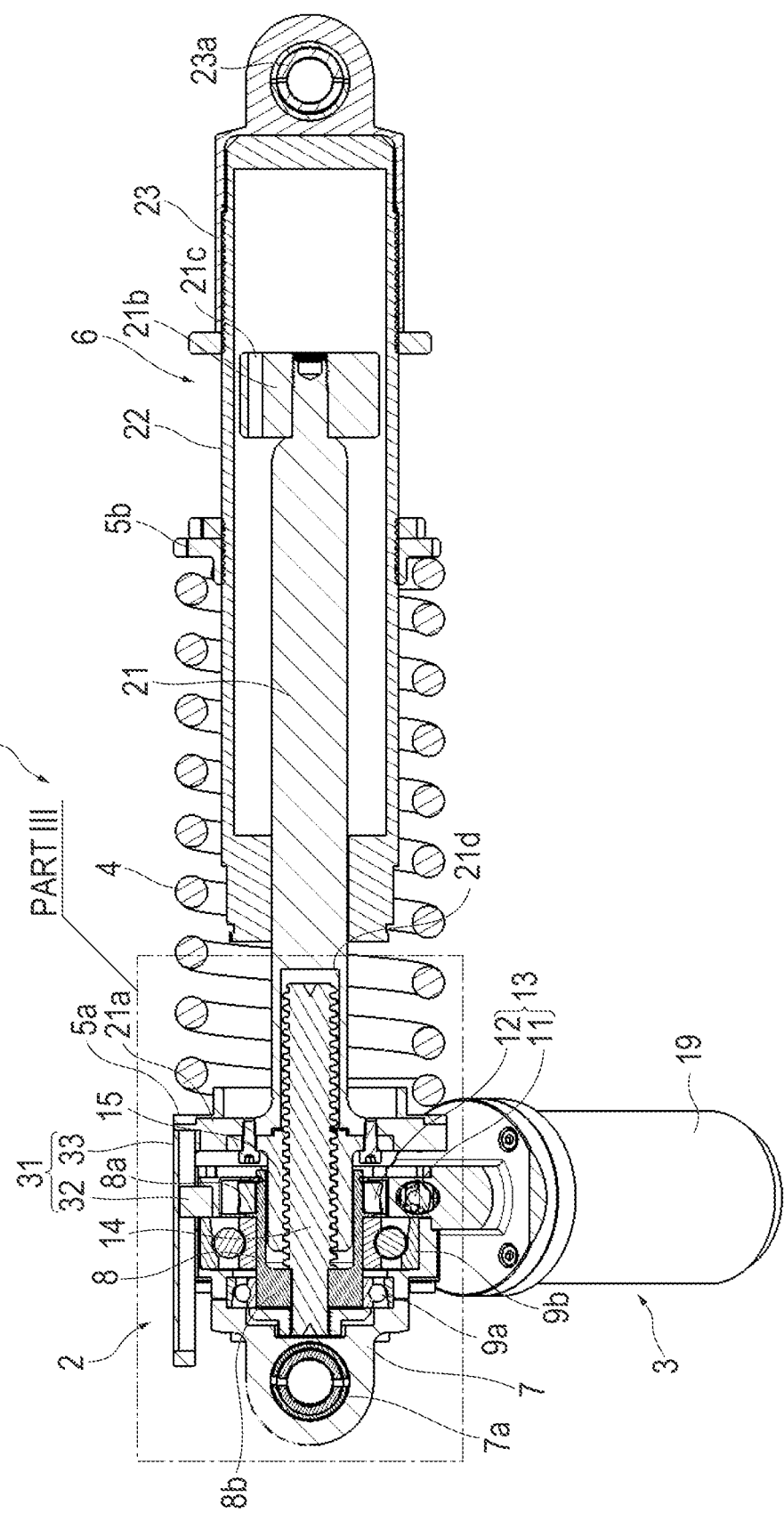
FIG. 2 is a vertical cross-sectional view of the suspension of the embodiment (a state where the suspension is shortest).

An actuator and a suspension of embodiments of the present invention are described in detail hereinafter with reference to the accompanying drawings. However, the actuator and the suspension of the present invention can be embodied in various forms, and are not limited to the embodiments described in the description. The embodiments are provided with the intension of enabling those skilled in the art to fully understand the invention by fully disclosing the description.

First Embodiment

FIG. 1 is an external view of a suspension 1 (height adjustable suspension) of a first embodiment of the present invention where an actuator 2 of the first embodiment is incorporated. FIG. 1(a) is a side view, and FIG. 1(b) is a front view. The reference sign 2 denotes an actuator including a drive unit 3. A reference sign 4 denotes a suspension spring. Reference signs 5a and 5b denote spring bearings. A reference sign 6 denotes a shock absorber. The suspension spring 4 and the shock absorber 6 absorb road irregularity. The suspension spring 4 determines the nominal height of the vehicle body. The actuator 2 can extend and contract. The actuator 2 extends and contracts and therefore the vehicle body rises and lowers.

The suspension 1 is provided between the vehicle body side portion and the wheel side portion. A method for mounting the suspension 1 on the vehicle is not limited. The suspension 1 may be an independent suspension, or axle suspension. For example, one end of the suspension 1 (one end of a casing 7) is coupled to the vehicle body, and the other end of the suspension 1 (the other end of the shock absorber 6) is coupled to a lower arm, or coupled to the lower arm via a push rod.

Figure 3:
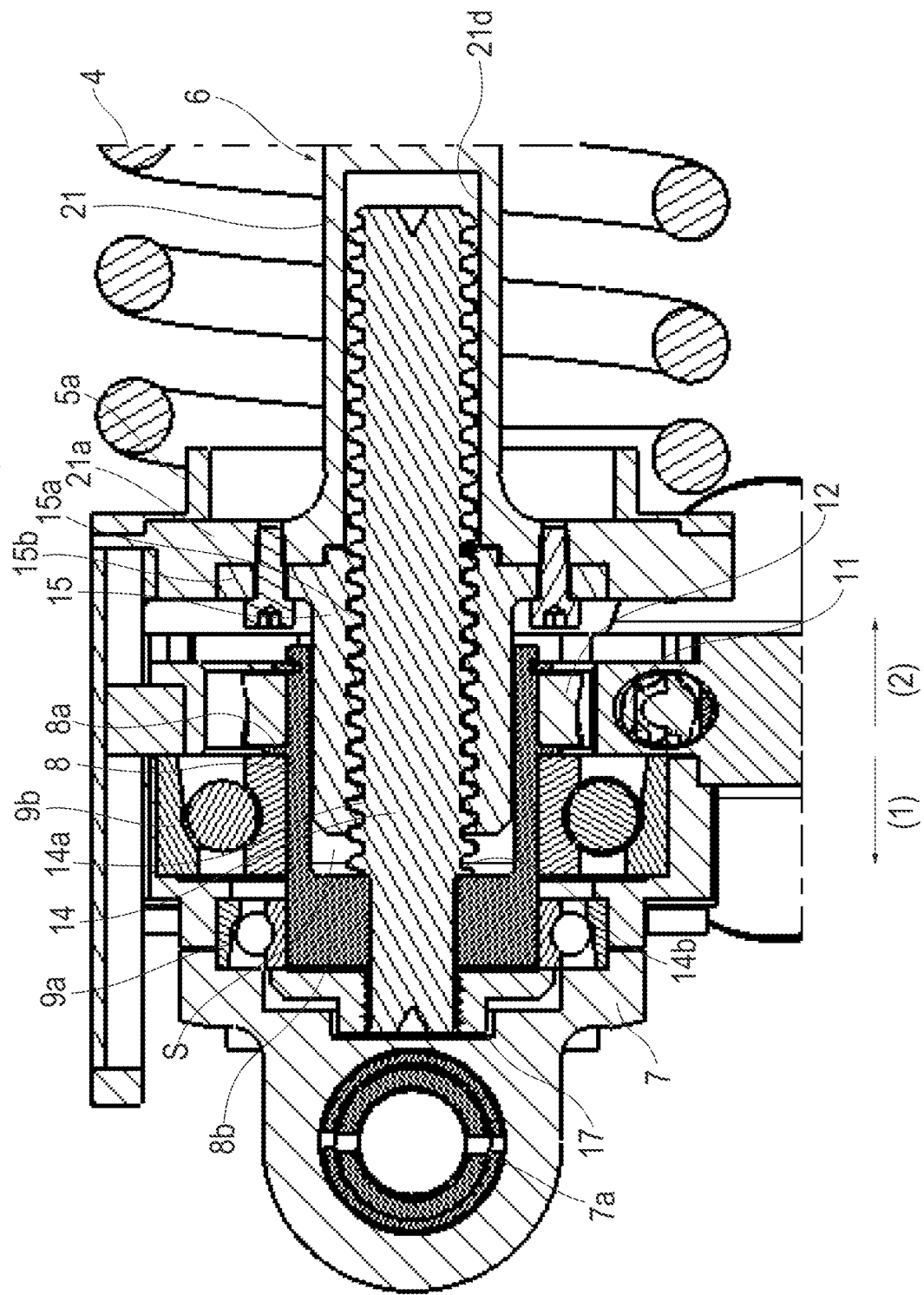
FIG. 3 is an enlarged view of a part III in FIG. 2 (a vertical cross-sectional view of the actuator).

FIG. 2 is a vertical cross-sectional view of the suspension 1 of the embodiment. FIG. 3 is an enlarged view of a part III in FIG. 2. As illustrated in FIG. 3, the actuator 2 of the embodiment includes the casing 7, bearings 9a and 9b, a hollow shaft 8, a screw shaft 14, a nut 15, the drive unit 3, and an anti-rotation mechanism 31 (also refer to FIG. 2). They are described in turn below.

The casing 7 has a substantially bottomed cylindrical shape. The casing 7 is provided with a spherical bearing 7a to be coupled to the vehicle body side portion. The hollow shaft 8 is supported by the casing 7 via the bearings 9a and 9b in such a manner as to be rotatable. The hollow shaft 8 has a substantially bottomed cylindrical shape with a smaller diameter than the casing 7. A flange 8a is formed on the hollow shaft 8. The flange 8a is brought into contact with the bearing 9b to determine the position of the hollow shaft 8 in one direction in the axial direction (a direction (1) in the drawing). A worm wheel 12 that meshes with a worm 11 is fixed to the flange 8a. Specifically, the ring-shaped worm wheel 12 is fixed to the flange 8a by use of a fixing means such as a snap ring or press-fitting with a serrated shape.

The bearings 9a and 9b that rotatably support the hollow shaft 8 are, for example, angular bearings. The bearing 9b receives a load in the one direction in the axial direction (the direction (1) in the drawing in which the weight of the vehicle body acts). The bearing 9a receives a load in the other direction in the axial direction (a direction (2) in the drawing in which the vehicle body rises). The bearing 9b is larger than the bearing 9a. The type, numbers, and sizes of the bearings 9a and 9b are not limited to the above. Thrust bearings may be used for the bearings 9a and 9b.

The screw shaft 14 sharing a common center line with the hollow shaft 8 is coupled to a bottom portion 8b of the hollow shaft 8. An annular housing space S (also refer to FIG. 4) is formed between the hollow shaft 8 and the screw shaft 14. The inside diameter of the hollow shaft 8 is larger than the outside diameter of the nut 15. The housing space S is formed in such a manner as to allow the nut 15 to enter.

The screw shaft 14 is coupled to the hollow shaft 8 in such a manner as to be incapable of rotating and incapable of moving in the axial direction by use of coupling means such as a key (not illustrated) and a fastening member 17. The key is disposed between the hollow shaft 8 and the screw shaft 14, and couples the screw shaft 14 to the hollow shaft 8 in such a manner as to be incapable of relative rotation. The annular fastening member 17 is threadedly engaged with an end of the screw shaft 14, and sandwiches the bearings 9a and 9b in conjunction with the flange 8a of the hollow shaft 8. The fastening member 17 makes the screw shaft 14 immovable relative to the hollow shaft 8 in the axial direction. A step 14b that is in contact with the bottom portion 8b of the hollow shaft 8 is formed on the screw shaft 14. The hollow shaft 8 and the screw shaft 14 may be integrated into a single component.

A male thread 14a such as such as a trapezoidal thread is formed on the outer surface of the screw shaft 14. The nut 15 surrounding the screw shaft 14 is threadedly connected to the screw shaft 14. A female thread 15a such as a trapezoidal thread that threadedly engages with the male thread 14a is formed on the inner surface of the nut 15. Screw rollers placed at regular spacings in the circumferential direction may be disposed between the screw shaft 14 and the nut 15, or multiple balls may be disposed between the thread groove of the screw shaft 14 and the thread groove of the nut 15 in such a manner as to be capable of rolling motion.

A flange 15b is formed at one end of the nut 15. The nut 15 is coupled to an inner rod 21 of the shock absorber 6 via the flange 15b by use of a coupling means such as a bolt. A flange 21a is also formed at one end of the inner rod 21 of the shock absorber 6. The spring bearing 5a is fixed to the flange 21a of the inner rod 21. A cushioning material (not illustrated) that prevents contact between the flange 21a and the casing 7 is mounted on the flange 21a of the inner rod 21.

As illustrated in FIG. 2, the drive unit 3 includes a motor 19 and a gear device 13. As illustrated in FIG. 1, a gearbox 7b that houses the gear device 13 is formed in the casing 7. The motor 19 is mounted on the gearbox 7b. The center line of the motor 19 is square to the center line of the screw shaft 14 of the actuator 2. As illustrated in FIG. 2, the gear device 13 includes the worm 11 and the worm wheel 12. The worm 11 is coupled to the output shaft of the motor 19. The worm wheel 12 meshes with the worm 11. As described above, the worm wheel 12 is provided to the flange 8a of the hollow shaft 8.

When the motor 19 is rotationally driven, the hollow shaft 8 rotates via the gear device 13. When the hollow shaft 8 rotates, the screw shaft 14, together with the hollow shaft 8, rotates. The rotation of the nut 15 is prevented by the anti-rotation mechanism 31. Therefore, the nut 15 moves in the axial direction.

Figure 5:
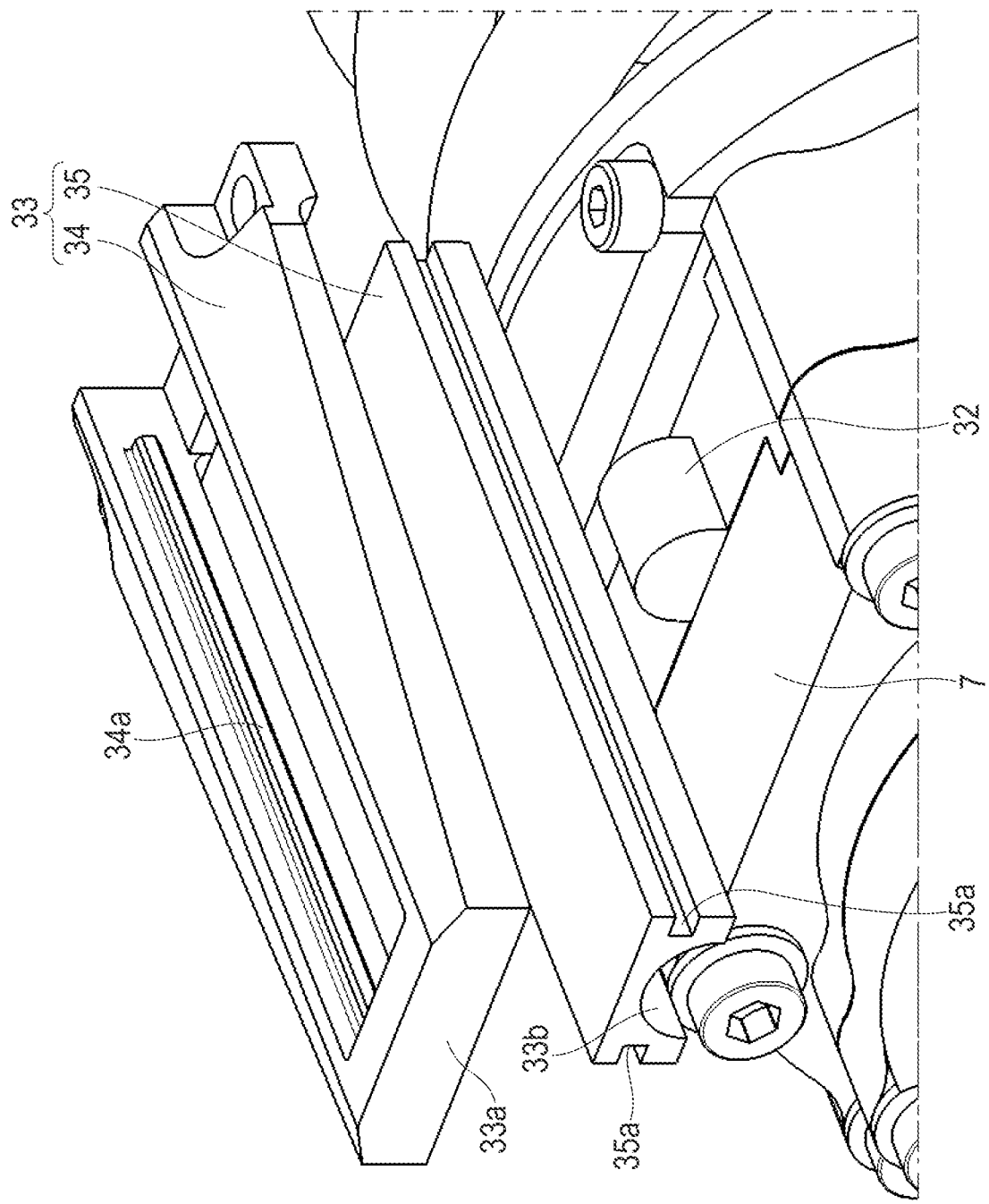
FIG. 5 is a detailed view of an anti-rotation mechanism (an enlarged view of a part V in FIG. 4).

The anti-rotation mechanism 31 includes a projection 32 and an anti-rotation member 33. As illustrated in FIG. 5, the projection 32 is fixed to the outer surface of the casing 7. The projection 32 has, for example, a semicircular cylindrical shape. The anti-rotation member 33 faces the outer surface of the casing 7. As illustrated in FIG. 2, the anti-rotation member 33 is coupled to the nut 15 via the flange 21a of the inner rod 21 by use of a coupling means such as a bolt.

As illustrated in FIG. 5, the anti-rotation member 33 includes a frame-shaped guide stopper 34, and a guide rail 35 where the guide stopper 34 fits. A groove 33b that the projection 32 fits in and extends in the axial direction is formed in the guide rail 35. The groove 33b has a semicircular shape in cross section. A distal end of the guide stopper 34 is provided with a stopper 33a that can come into contact with the projection 32. A ridge 34a formed on the inner side surface of the guide stopper 34 fits in a groove 35a formed in the side surface of the guide rail 35, and the guide stopper 34 is coupled to the flange 21a of the inner rod 21 by use of a coupling means such as a bolt. The guide stopper 34 and the guide rail 35 may be integrated into a single component.

As illustrated in FIG. 2, the suspension 1 of the embodiment includes the actuator 2, the suspension spring 4, and the shock absorber 6. The suspension spring 4 and the shock absorber 6 are described in turn below.

The suspension spring 4 is a coil spring concentric with the shock absorber 6. The suspension spring 4 is disposed between the spring bearings 5a and 5b. The spring bearing 5a mates with the nut 15. The spring bearing 5b is fixed to the shock absorber 6.

The shock absorber 6 includes the inner rod 21 and a case 22. The spring bearing 5b is fixed to the case 22. A coupling member 23 provided with a spherical bearing 23a is fixed at an end of the case 22.

A hydraulic fluid is filled in the case 22. An end of the inner rod 21 is provided with a piston 21b. The piston 21b divides the inside of the case 22 into two working chambers. An orifice 21c is formed on the piston 21b. The shock absorber 6 is configured in such a manner as to produce a damping force when the inner rod 21 moves relative to the case 22 in the axial direction.

A hollow portion 21d (also refer to FIG. 3) is formed at an end of the inner rod 21. The hollow portion 21d comprises a hole extending in the axial direction. The inside diameter of the hollow portion 21d is larger than the outside diameter of the screw shaft 14. The hollow portion 21d is formed in such a manner as to allow the screw shaft 14 to enter.

The configurations of the actuator 2 and the suspension 1 of the embodiment have been described above. According to the actuator 2 and the suspension 1 of the embodiment, the following operations and effects take place. The screw shaft 14 is rotationally driven by the drive unit 3. Consequently, the nut 15 whose rotation is prevented by the anti-rotation mechanism 31 moves in the axial direction of the screw shaft 14. The spring bearing 5a mates with the nut 15. Therefore, the spring bearing 5a moves relative to the casing 7 in the axial direction of the screw shaft 14. Hence, the actuator 2 (the suspension 1) extends and contracts between the shortest state illustrated in FIG. 2 and the longest state illustrated in FIG. 4.

In the state where the actuator 2 (the suspension 1) is shortest illustrated in FIG. 2, the nut 15 enters between the hollow shaft 8 and the screw shaft 14, and overlaps the bearing 9b (in other words, the nut 15 coincides with the bearing 9b in side view). Moreover, the screw shaft 14 enters the hollow portion 21d of the inner rod 21. Furthermore, the anti-rotation member 33 overlaps the bearings 9a and 9b (in other words, the anti-rotation member 33 coincides with the bearings 9a and 9b in side view). Hence, it is possible to reduce the total length of the actuator 2 while ensuring the stroke of the nut 15, and by extension to reduce the total length of the suspension 1.

In the known actuator and suspension, the bearing, the nut, and the inner rod are placed in such a manner as not to overlap each other. Hence, it is necessary to make the actuator and the suspension long in total length to ensure the stroke of the nut. According to the suspension 1 of the embodiment, it is possible to reduce the total lengths of the actuator 2 and the suspension 1 while ensuring the stroke of the nut 15.

Figure 4:
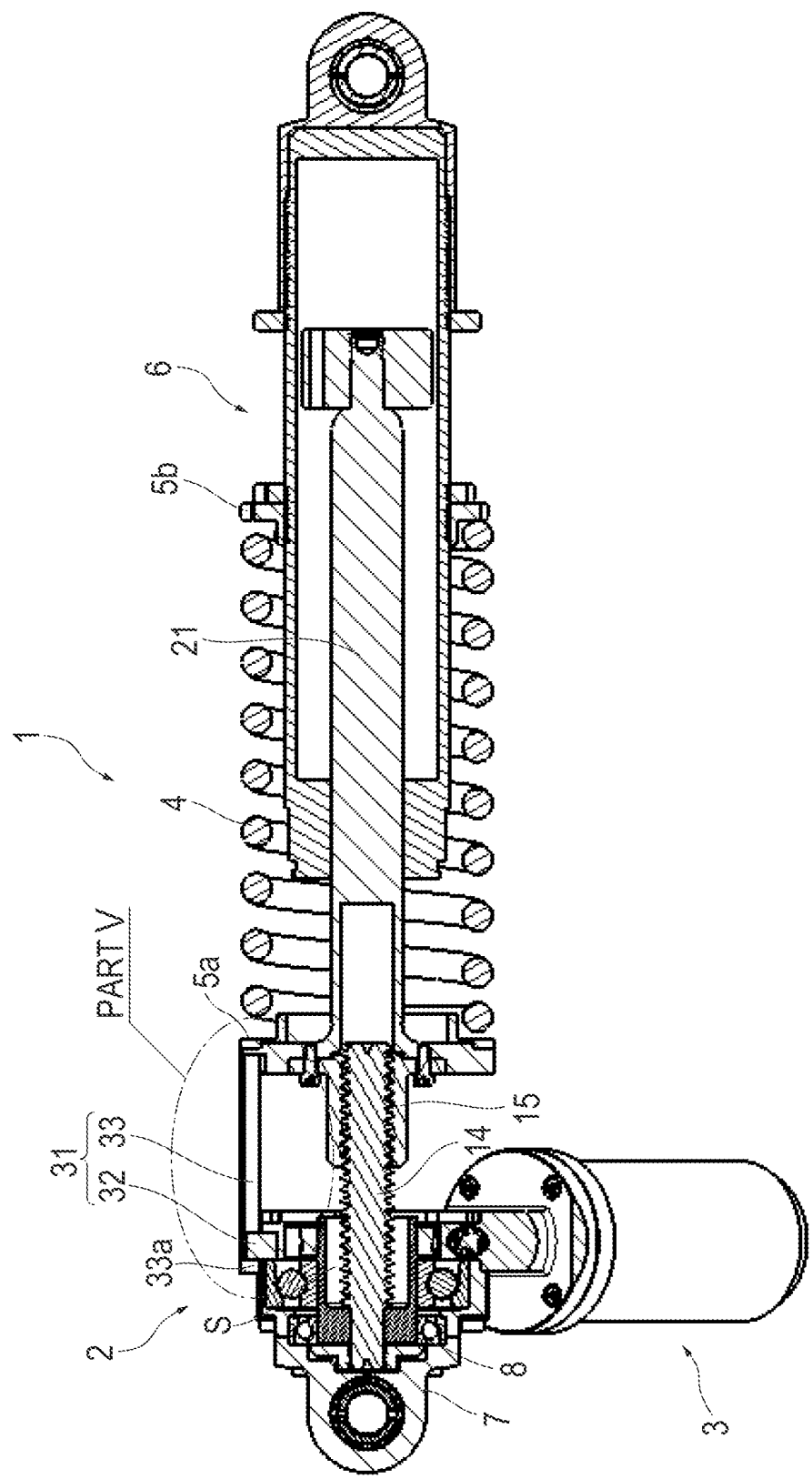
FIG. 4 is a vertical cross-sectional view of the suspension of the embodiment (a state where the suspension is longest).

In the state where the actuator 2 (the suspension 1) is longest illustrated in FIG. 4, the stopper 33a of the anti-rotation member 33 comes into contact with the projection 32 to restrict the movement of the nut 15 relative to the casing 7 in the axial direction. Hence, it is possible to prevent the nut 15 from coming off the screw shaft 14.

In the known actuator and suspension, it is necessary to provide a stopper at the end of the screw shaft to prevent the nut from coming off the screw shaft. According to the actuator 2 and the suspension 1 of the embodiment, the anti-rotation member 33 is provided with the stopper 33a. Hence, it is possible to easily prevent the nut 15 from coming off the screw shaft 14.

Second Embodiment

Figure 6:
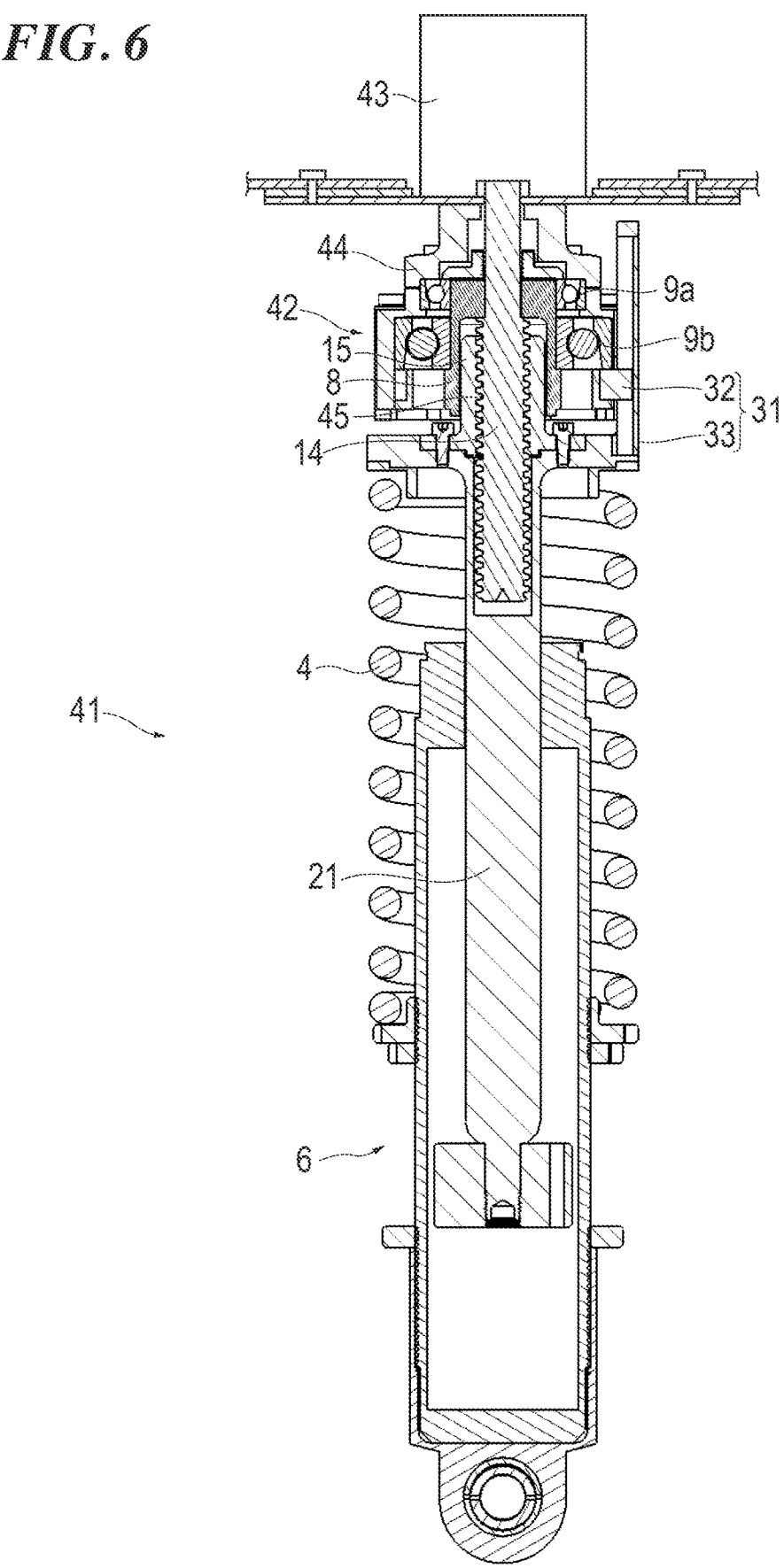
FIG. 6 is a vertical cross-sectional view of a suspension of a second embodiment of the present invention where an actuator of the second embodiment of the present invention is incorporated.

FIG. 6 is a vertical cross-sectional view of a suspension (electromagnetic suspension) of a second embodiment of the present invention where an actuator 42 of the second embodiment of the present invention is incorporated. The reference sign 42 denotes an actuator including a motor 43. A reference sign 4 is a suspension spring. A reference sign 6 denotes a shock absorber.

The configurations of the suspension spring 4 and the shock absorber 6 are substantially the same as the suspension 1 of the first embodiment. Accordingly, the same reference signs are assigned to the configurations thereof, and descriptions thereof are omitted. The configurations of a hollow shaft 8, a screw shaft 14, a nut 15, bearings 9a and 9b, and an anti-rotation mechanism 31 of the actuator 42 are also substantially the same as the suspension 1 of the first embodiment. Accordingly, the same reference signs are assigned to the configurations thereof, and descriptions thereof are omitted.

In the suspension 41 of the second embodiment, a casing 44 of the actuator 42 is elastically mounted on the vehicle body. The screw shaft 14 penetrates the casing 44 and the vehicle body. The motor 43 is coupled to one end of the screw shaft 14.

A ball screw is used as a screw mechanism of the actuator 42 to increase the reverse efficiency. In other words, multiple balls 45 are disposed between the thread groove of the screw shaft 14 and the thread groove of the nut 15 in such a manner as to be able to roll.

When the distance between the vehicle body side portion and the wheel side portion changes, the nut 15 moves up and down (the nut 15 moves in the axial direction of the screw shaft 14). The movement of the nut 15 in the axial direction is converted to the rotational motion of the screw shaft 14 by the screw mechanism. When the screw shaft 14 rotates, the motor 43 generates electric power. The resistance of the motor 43 at times of generating electric power enables the production of a damping force in the suspension 41. The shock absorber 6 absorbs high frequency vibrations that are inputted from the road surface, and makes the high frequency vibrations hard to be transmitted to the nut 15.

On the other hand, when the motor 43 is rotated by a battery power supply, the nut 15 moves up and down, and the inner rod 21 of the shock absorber 6, together with the nut 15, moves up and down. The propulsive force of the inner rod 21 is transmitted to the wheel side portion in a state of having been absorbed to some extent by the shock absorber 6. Consequently, it is possible to adjust the damping force of the suspension 41.

Effects substantially similar to the suspension 1 of the first embodiment take place also in the suspension 41 of the second embodiment. Consequently, a detailed description thereof is omitted.

The present invention is not limited to the realization of the embodiments, and can be modified into other embodiments within the scope where the gist of the present invention is not changed.

In the above embodiments, the example where the actuator is incorporated in the suspension has been described. However, the actuator is not limited to being incorporated in the suspension. The actuator can be used as, for example, a telescopic actuator, or an X-axis actuator that moves a movable portion in an X-axis direction.

The description is based on Japanese Patent Application No. 2019-208426 filed on Nov. 19, 2019, the entire contents of which are incorporated herein.

REFERENCE SIGNS LIST

1 Suspension
2 Actuator
3 Drive unit
6 Shock absorber
7 Casing
8 Hollow shaft
8b Bottom portion
9a, 9b Bearing
14 Screw shaft
15 Nut
21 Inner rod
21d Hollow portion
32 Projection
33 Anti-rotation member
33a Stopper
33b Groove
41 Suspension
42 Actuator
43 Motor
44 Casing

The invention claimed is:

1. An actuator comprising:
a casing;
a hollow shaft rotatably supported by the casing via a bearing, the hollow shaft including a bottom portion;
a screw shaft coupled to the bottom portion of the hollow shaft, the screw shaft sharing a common center line with the hollow shaft; and
a nut threadedly connected to the screw shaft, wherein
the screw shaft is coupled to the hollow shaft so as to be incapable of rotating relative to the hollow shaft and incapable of moving in an axial direction relative to the hollow shaft, and
the nut is capable of moving in an axial direction of the screw shaft to enter between the hollow shaft and the screw shaft.

2. The actuator according to claim 1, wherein
a projection is fixed to an outer surface of the casing, and
the nut is coupled to an anti-rotation member configured to prevent the rotation of the nut, the anti-rotation member including a groove formed to allow the projection to fit therein.

3. The actuator according to claim 2, wherein the anti-rotation member is provided with a stopper configured to come into contact with the projection and restrict the movement of the nut relative to the casing in the axial direction.

4. A suspension comprising the actuator according to claim 3.

5. A suspension comprising the actuator according to claim 2.

6. A suspension comprising the actuator according to claim 1.

7. The suspension according to claim 6, wherein
the nut is coupled to an inner rod of a shock absorber, and
a hollow portion of the inner rod allows the screw shaft to enter.

8. The suspension according to claim 7, wherein the screw shaft is rotationally driven by a drive unit, and the nut is moved relative to the screw shaft in an axial direction to adjust the height of a vehicle.

9. The suspension according to claim 7, wherein the screw shaft is connected to a motor for producing a damping force.

10. The suspension according to claim 6, wherein the screw shaft is rotationally driven by a drive unit, and the nut is moved relative to the screw shaft in an axial direction to adjust the height of a vehicle.

11. The suspension according to claim 6, wherein the screw shaft is connected to a motor for producing a damping force.

12. A suspension comprising:
a casing;
a screw shaft rotatably supported by the casing via a bearing;
a nut threadedly connected to the screw shaft; and
a shock absorber including an inner rod, wherein
the nut is coupled to the inner rod of the shock absorber,
the inner rod is coupled to the nut so as to be incapable of rotating relative to the nut and incapable of moving in an axial direction relative to the nut, and
a hollow portion of the inner rod allows the screw shaft to enter.

13. The suspension according to claim 12, wherein the screw shaft is rotationally driven by a drive unit, and the nut is moved relative to the screw shaft in an axial direction to adjust the height of a vehicle.

14. The suspension according to claim 12, wherein the screw shaft is connected to a motor for producing a damping force.

15. A suspension comprising:
a casing;
a screw shaft rotatably supported by the casing via a bearing;
a nut threadedly connected to the screw shaft;
a projection fixed to an outer surface of the casing; and
an anti-rotation member coupled to the nut, including a groove formed to allow the projection to fit therein, to prevent the rotation of the nut,
wherein the anti-rotation member is coupled to the nut so as to be incapable of rotating relative to the nut and incapable of moving in an axial direction relative to the nut.

16. The suspension according to claim 15, wherein the screw shaft is rotationally driven by a drive unit, and the nut is moved relative to the screw shaft in an axial direction to adjust the height of a vehicle.

17. The suspension according to claim 15, wherein the screw shaft is connected to a motor for producing a damping force.

* * * * *